Nov. 16, 1943.        H. J. MURPHY        2,334,681
ROTARY OPERATIVE CLOSURE FASTENER
Filed June 13, 1942
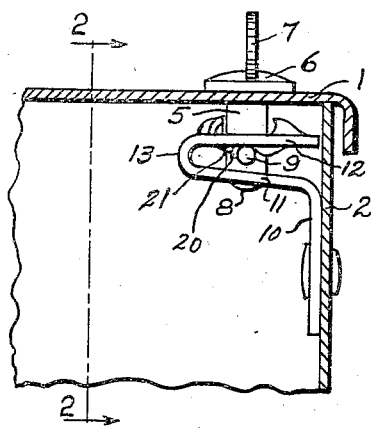
*Fig. 1.*
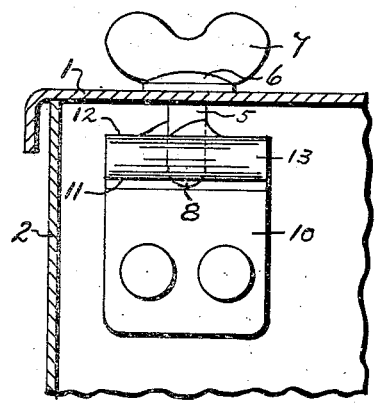
*Fig. 2.*
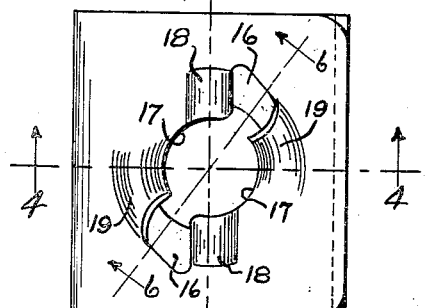
*Fig. 3.*
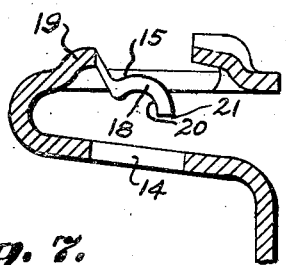
*Fig. 4.*
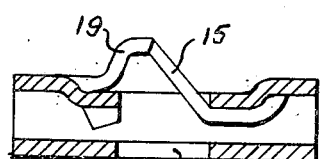
*Fig. 5.*
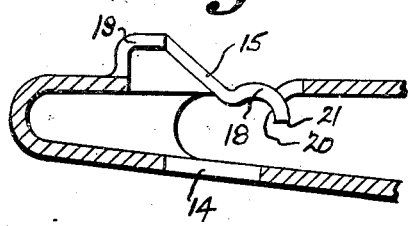
*Fig. 6.*
*Fig. 7.*
Inventor:
Howard J. Murphy.
By Walter P. Jones
Atty.

Patented Nov. 16, 1943

2,334,681

UNITED STATES PATENT OFFICE 2,334,681

ROTARY OPERATIVE CLOSURE FASTENER

Howard J. Murphy, Greenwood, Mass., assignor to United-Carr Fastener Corporation, Cambridge, Mass., a corporation of Massachusetts Application June 13, 1942, Serial No. 446,981

4 Claims. (Cl. 24—221)

The present invention relates to fasteners for receptacle closures and like structures, and aims generally to improve existing fasteners of that type.

Among the primary aims and objects of the invention is the provision of an improved closure fastener of the rotary type that will positively and effectively lock a closure to a receptacle with a minimum of effort, and yet be extremely simple of construction and assembly and economical to manufacture.

Illustrative of the invention, reference is made to the accompanying drawing showing a preferred embodiment, and in which:

Fig. 1 is an edge elevation of the fastener according to the invention, a portion of the receptacle and closure being shown in section;

Fig. 2 is a side elevation as viewed on the line 2—2 of Fig. 1;

Fig. 3 is an enlarged plan view of the female fastening member;

Fig. 4 is an enlarged edge view thereof;

Fig. 5 is a transverse sectional view taken on the line 5—5 of Fig. 3;

Fig. 6 is a diagonal sectional view as taken on the line 6—6 of Fig. 3; and

Fig. 7 is a perspective view of the female fastener part.

According to the invention my improved fastener comprises a rotary stud part, mounted in one of the parts to be secured as, for example, a closure of a receptacle, and a female fastener part adapted to receive and lock said rotary stud part, and fixedly mounted on another part to be secured as, for example, the side wall of a receptacle.

Referring to the embodiment of the invention illustrated in the drawing, the rotary stud part of the fastener is preferably rotatably mounted in an aperture in the closure 1, and comprises a shank 5 of suitable length having an annular head 6 and a winged handle or operating portion 7 at one end thereof on the outer side of the closure. The shank, as will be apparent, extends beyond the inner face of the closure 1 and may be formed with a rounded nose 8 and a transverse pin forced into a hole in the shank after the shank is put through the aperture in the closure 1, and presenting radial arms 9. The stud is permitted limited axial movement in the closure 1, which movement is limited by the head 6 and radial arms 9.

The female fastening element is advantageously fixedly mounted on an inner side wall 2 of the receptacle and is adapted to receive and interlock with the radial arms 9 of the stud on rotation thereof.

Advantageously, the female fastening element comprises a strip of resilient metal having a base 10 adapted to be attached to the inner side wall 2 of the receptacle, and a laterally offset U-shaped bracket having spaced portions 11 and 12 connected by a bight 13. The portions 11 and 12 are provided with apertures 14 and 15 respectively of a size to receive the nose 8 and shank 5 of the rotary stud.

The aperture 15 in the outer bracket portion 12 is formed with radial elongations 16 on opposite sides thereof, preferably diagonally of the bracket, providing passages for the radial arms 9 of the stud so that upon insertion of the stud in the openings 14 and 15 the radial arms 9 may be positioned between the bracket portions 11 and 12.

The opposed marginal portions 17 of the opening 15 between the diametrically opposed radial elongations 16 are dished outwardly to provide relatively rigid pin-receiving channels 18, cam means 19, and locking seats 20 and, preferably, these are oppositely arranged on the respective marginal portions 17 so as to simultaneously receive and similarly act upon the opposed radial arms 9 as the stud is rotated. It will be noted that the entering end of the receiving channel opens into its adjacent radial elongation 16 with an overhanging lip adapted to overlie the end of the radial arm as it is turned from the elongation 16. The marginal edge of the aperture 15 then slopes inwardly to the plane of the bracket portion 12, providing a cam 19 beyond which is a locking seat 20. The opposite end of the marginal edge terminates in an inwardly extending stop 21 which limits rotation of the stud shank and radial pin.

When the closure 1 is applied to the receptacle 2 the stud is aligned with the opening 15 of the female fastener member and if the radial arms 9 of the stud shank are not aligned with the elongations 16 the stud will be displaced outwardly being free to move axially in the closure. The stud may then be rotated to a position where the radial arms 9 enter the elongations 16 and continued rotation in a clockwise direction moves the radial arms into the receiving channel 18 and under the overhanging lip thereof, thence across the inwardly sloping cam surface 19 and into the locking seat 20. As the cam 19 is formed in the outer portion of a U-shaped bracket member, movement of the arms 9 across the cam causes a resilient flexing of the bracket portion 12 causing the closure to be drawn toward the receptacle wall 2 under spring tension. Furthermore, the bight portion 13 of the bracket resiliently connects the bracket portions 11 and 12 and the arms 9 are moved into the locking seat 20 and snapped therein under a spring action.

The invention provides a simple and highly effective positive fastener for receptacle closures and the like.

Although I have illustrated and described a preferred embodiment, I do not wish to be limited thereby because the scope of my invention is best defined in the following claims.

I claim:

1. A fastener for receptacle closures and the like in combination with a rotary stud member provided with radial arms and loosely mounted in said closure, of a female fastening element comprising a base adapted to be secured to a receptacle wall, and an offset apertured bracket portion resiliently connected to and extending from said base in a plane generally normal to the plane of said base, the aperture of said bracket being formed with radial elongations to admit the passage of the radial arms of said stud, and the marginal portions adjacent to said aperture between said radial elongations being dished outwardly to provide successive arm-receiving channel, cam and locking seat means.

2. A fastener for receptacle closures and the like in combination with a rotary stud member provided with radial arms and loosely mounted in said closures, of a female fastening element comprising a base adapted to be secured to a receptacle wall, and an offset apertured U-shaped bracket portion resiliently connected to and extending from said base in a plane generally normal to the plane of said base, the aperture of said bracket being formed with radial elongations to admit the passage of the radial arms of said stud, and the marginal portions adjacent to said aperture between said radial elongations being dished outwardly to provide successive arm-receiving channel, cam and locking seat means.

3. A fastener for receptacle closures and the like in combination with a rotary stud member provided with radial arms and loosely mounted in said closures, of a female fastening element comprising a base and adapted to be secured to a receptacle wall, and an offset apertured U-shaped bracket portion resiliently connected to and extending laterally from said base, the aperture of said bracket being formed with radial elongations to admit the passage of the radial arms of said stud between offset portions of the U-shaped bracket, and the marginal portions adjacent to said aperture between said radial elongations being dished outwardly to provide successive arm-receiving channel, cam and locking seat means between the said portions of said bracket.

4. In a fastener of the type described employing a rotary stud member provided with radial arms and loosely mounted in a part to be supported; a female fastener element comprising a base fixedly secured to a support, a U-shaped member presenting spaced bracket portions laterally offset from said base in a plane generally normal to the plane of said base and connected thereto by one of said bracket portions, the other bracket portion being provided with a central aperture formed with radial elongations to admit the passage of the radial arms of said stud, and the marginal portions adjacent to said aperture between said radial elongations being dished outwardly to provide successive arm-receiving channel, cam and locking seat means.

HOWARD J. MURPHY.